United States Patent
Lee et al.

(10) Patent No.: US 10,756,362 B2
(45) Date of Patent: Aug. 25, 2020

(54) AIR SHUT-OFF VALVE APPARATUS FOR FUEL CELL SYSTEM

(71) Applicants: Hyundai Motor Company, Seoul (KR); Kia Motors Corporation, Seoul (KR)

(72) Inventors: Byeong Seung Lee, Seoul (KR); Kyoung Ku Ha, Gyeonggi-do (KR); Hyun Yoo Kim, Seoul (KR); Jeong Hee Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 20 days.

(21) Appl. No.: 16/376,386

(22) Filed: Apr. 5, 2019

(65) Prior Publication Data
US 2020/0212460 A1 Jul. 2, 2020

(30) Foreign Application Priority Data
Jan. 2, 2019 (KR) .......................... 10-2019-0000303

(51) Int. Cl.
| | |
|---|---|
| *H01M 8/04* | (2016.01) |
| *H01M 8/04089* | (2016.01) |
| *H01M 8/04082* | (2016.01) |
| *F16K 1/20* | (2006.01) |
| *F16K 15/18* | (2006.01) |
| *H01M 8/04746* | (2016.01) |

(52) U.S. Cl.
CPC .......... *H01M 8/04089* (2013.01); *F16K 1/205* (2013.01); *F16K 1/2092* (2013.01); *F16K 15/183* (2013.01); *H01M 8/04201* (2013.01); *H01M 8/04753* (2013.01)

(58) Field of Classification Search
CPC ....................................................... H01M 8/04
See application file for complete search history.

(56) References Cited

U.S. PATENT DOCUMENTS

2016/0036073 A1* 2/2016 Kim .................. H01M 8/04291
429/414

* cited by examiner

*Primary Examiner* — Jacob B Marks
(74) *Attorney, Agent, or Firm* — Mintz Levin Cohn Ferris Glovsky and Popeo, P.C.; Peter F. Corless

(57) ABSTRACT

An air shut-off valve apparatus for a fuel cell system is provided. The apparatus includes a valve body having an inlet-side air passage through which supply air flows and an outlet-side air passage through which exhaust air flows. A valve flap is installed in the valve body to open or close the inlet-side air passage and the outlet-side air passage. An inlet-side check valve is opened when pressure of the supply air is greater than or equal to a predetermined pressure, to guide the supply air into the fuel cell stack through the inlet-side air passage even while the valve flap is closed. An outlet-side check valve is opened when pressure of the exhaust air is greater than or equal to a predetermined pressure, to guide the exhaust air released from the fuel cell stack to flow through the outlet-side air passage even while the valve flap is closed.

12 Claims, 5 Drawing Sheets

AIR SHUT-OFF VALVE APPARATUS FOR FUEL CELL SYSTEM

CROSS-REFERENCE TO RELATED APPLICATION

This application is claims the benefit of priority to Korean Patent Application No. 10-2019-0000303, filed on Jan. 2, 2019, the entire contents of which are incorporated herein by reference.

TECHNICAL FIELD

The present disclosure relates to an air shut-off valve apparatus for a fuel cell system, and more particularly, to an air shut-off valve apparatus that supplies minimum required supply air into a fuel cell stack and releases minimum required exhaust air from the fuel cell stack during a failure.

BACKGROUND

Fuel cell systems, which continually produce electrical energy through an electro-chemical reaction of fuel continuously supplied thereto, have been consistently studied and developed as an alternative for solving global environmental problems. The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) according to the types of electrolytes used. The fuel cell systems may be applied to various applications, such as mobile power supply, transportation, distributed power generation, and the like, according to operating temperatures and output ranges along with the types of fuels used.

Among the fuel cells mentioned above, the PEMFC is applied to a hydrogen vehicle (a hydrogen fueled cell vehicle) that is being developed to replace an internal combustion engine. The hydrogen vehicle is driven by producing electricity through an electro-chemical reaction of hydrogen and oxygen and operating a motor with the electricity produced. Accordingly, the hydrogen vehicle has a structure that includes a hydrogen ($H_2$) tank for storing hydrogen ($H_2$), a fuel cell stack (FC stack) that produces electricity through oxidation/reduction reactions of hydrogen ($H_2$) and oxygen ($O_2$), various apparatuses for draining water produced, a battery that stores the electricity produced by the fuel cell stack, a controller configured to convert and adjust the electricity produced, a motor configured to generate a driving force, and the like.

The fuel cell stack refers to a fuel cell body having tens or hundreds of cells stacked in series. Additionally, the fuel cell stack has a structure in which a plurality of cells are stacked between end plates, each cell including an electrolyte membrane that divides the interior of the cell into two parts, an anode on a first side of the electrolyte membrane, and a cathode on a second side thereof. A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

A fuel cell system includes an air shut-off valve apparatus configured to regulate supply air supplied into a fuel cell stack and exhaust air released from the fuel cell stack. The air shut-off valve apparatus includes a valve flap that is opened or closed by electrical control, and an air passage through which the supply air flows and/or an air passage through which the exhaust air flows may be opened or closed by the valve flap. When the valve flap is not operated normally due to a failure or malfunction in the air shut-off valve apparatus, air is unable to be supplied into the fuel cell stack. Accordingly, the fuel cell stack fails to generate electric power and driving power is unable to be supplied to a fuel cell vehicle.

SUMMARY

The present disclosure provides an air shut-off valve apparatus configured to supply minimum required supply air into a fuel cell stack and release minimum required exhaust air from the fuel cell stack even while a valve flap is not operated normally due to a failure in the air shut-off valve apparatus. The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an air shut-off valve apparatus for a fuel cell system may include a valve body having an inlet-side air passage through which supply air supplied into a fuel cell stack may flow and an outlet-side air passage through which exhaust air released from the fuel cell stack may flow, a valve flap pivotally installed in the valve body to open or close the inlet-side air passage and the outlet-side air passage, an inlet-side check valve opened when pressure of the supply air is greater than or equal to a predetermined pressure, to guide the supply air into the fuel cell stack through the inlet-side air passage even while the valve flap is closed, and an outlet-side check valve opened when pressure of the exhaust air is greater than or equal to a predetermined pressure, to guide the exhaust air released from the fuel cell stack to flow through the outlet-side air passage even while the valve flap is closed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
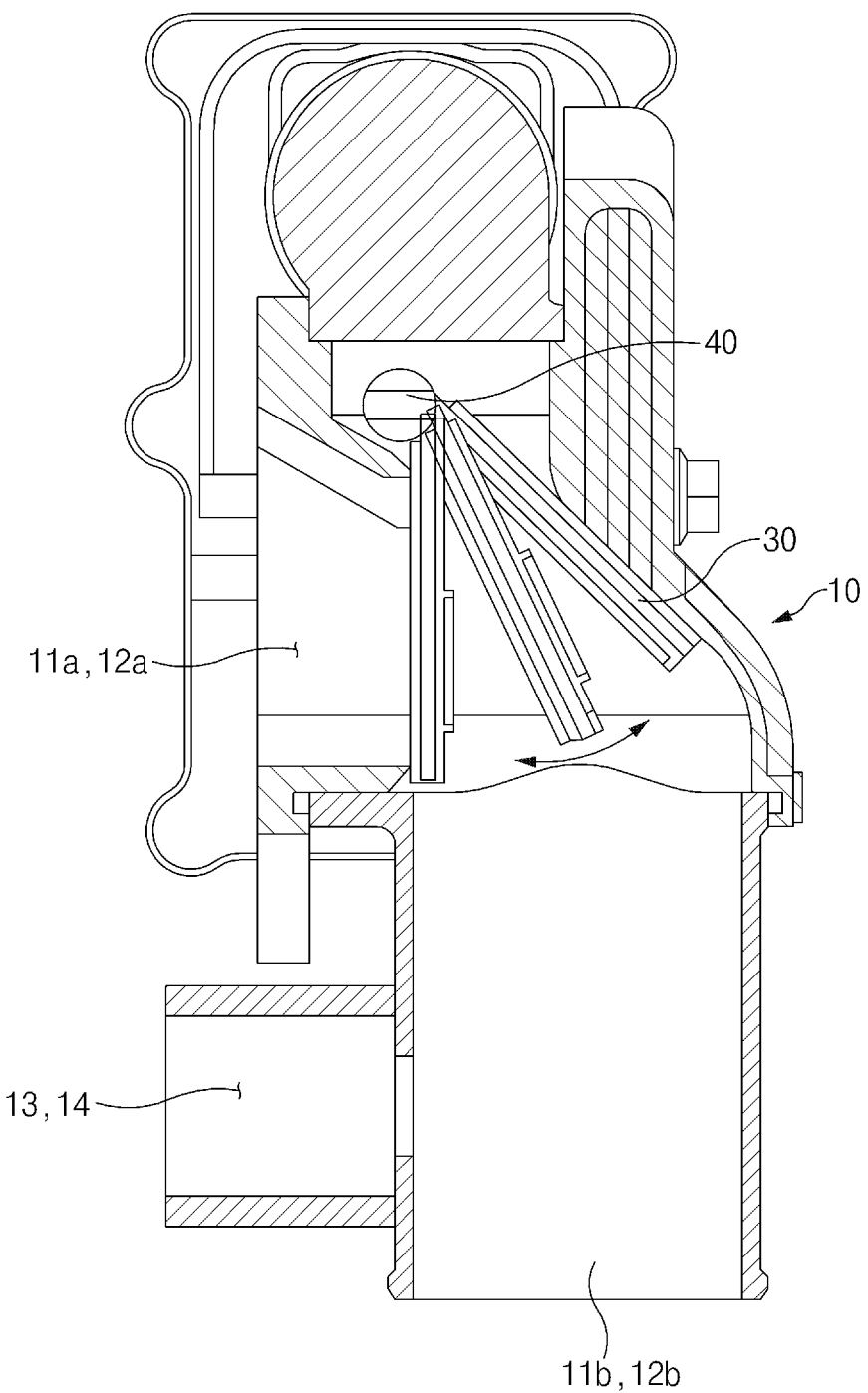
FIG. 1 is a sectional view illustrating an air shut-off valve apparatus for a fuel cell system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. It should be understood that even if shown in different drawings, identical components are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 2:
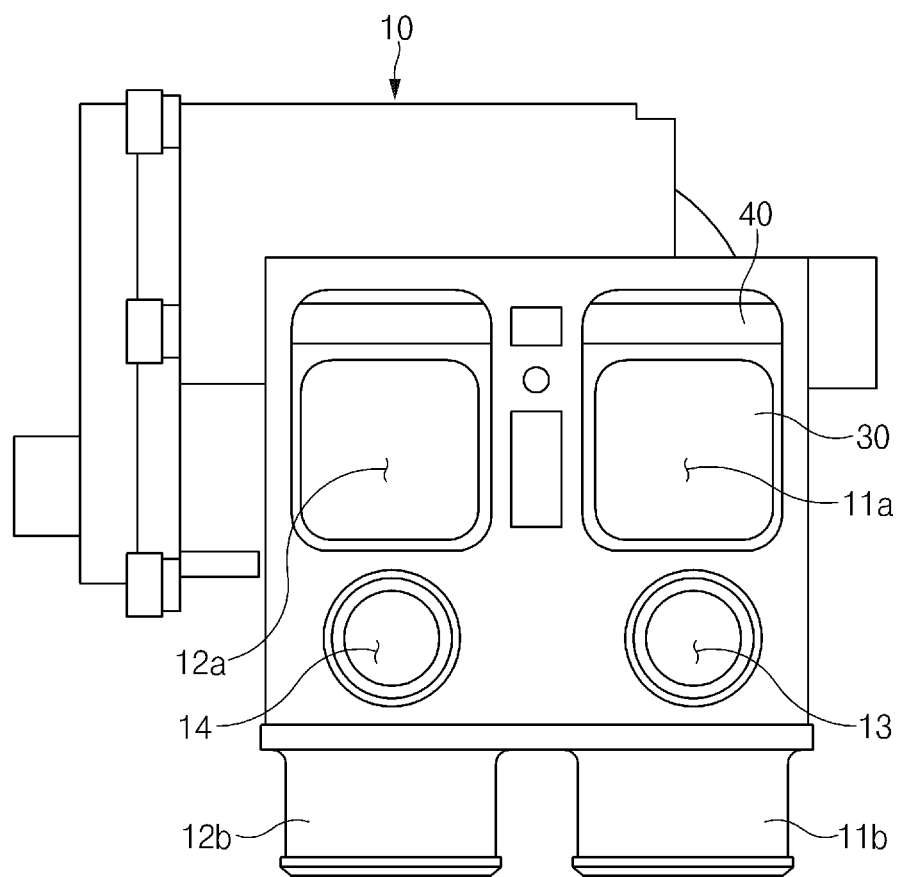
FIG. 2 is a side view illustrating the air shut-off valve apparatus of FIG. 1 according to an exemplary embodiment of the present disclosure.
Figure 3:
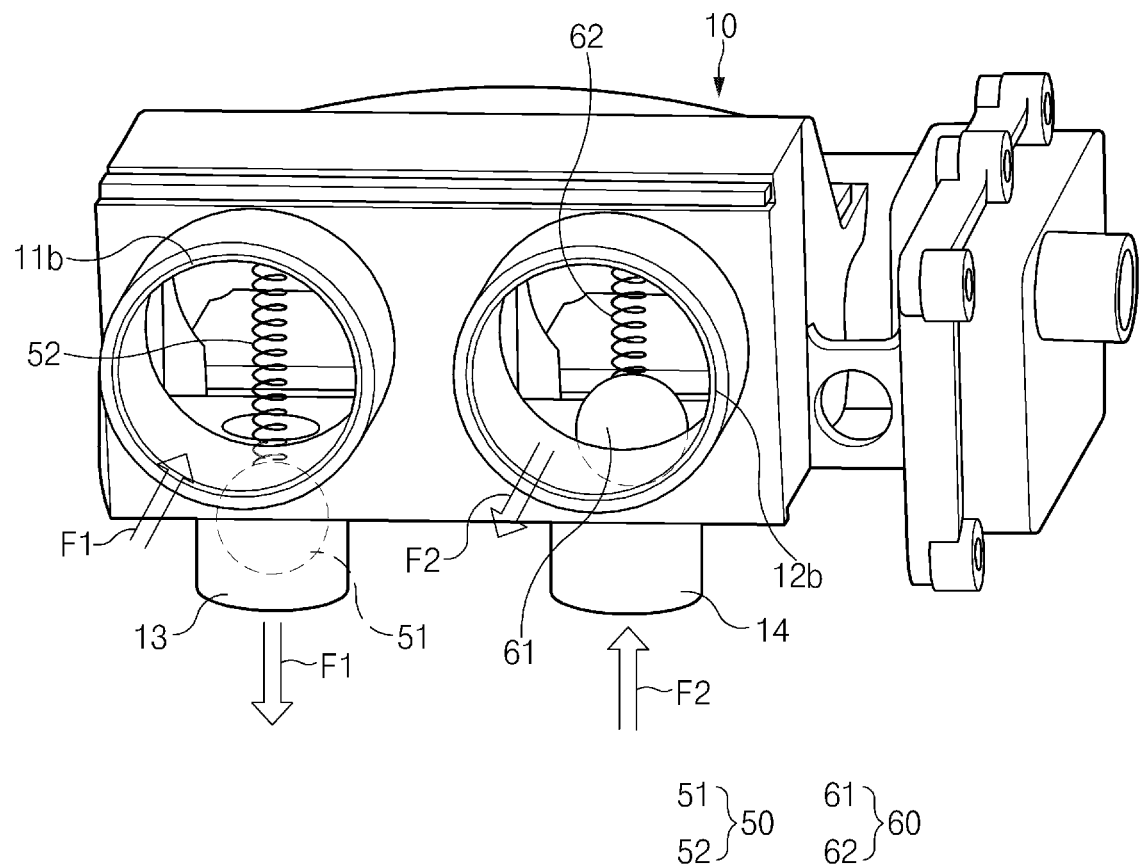
FIG. 3 is a perspective view illustrating a state in which check valves are installed in the air shut-off valve apparatus of FIG. 1 according to an exemplary embodiment of the present disclosure.

FIG. 1 is a sectional view illustrating an air shut-off valve apparatus for a fuel cell system according to an exemplary embodiment of the present disclosure. FIG. 2 is a side view illustrating the air shut-off valve apparatus of FIG. 1. FIG. 3 is a perspective view illustrating a state in which check valves are installed in the air shut-off valve apparatus of FIG. 1.

The air shut-off valve apparatus according to this exemplary embodiment may include a valve body 10, a valve flap 30, an inlet-side check valve 50, and an outlet-side check valve 60. The valve body 10 may form the appearance of the air shut-off valve apparatus and may include one or more bodies. The valve body 10 may have an inner space in which the valve flap 30 may be installed. Additionally, the valve body 10 may have inlet-side air passages 11a, 11b, and 13 and outlet-side air passages 12a, 12b, and 14 formed therein. Supply air supplied into a fuel cell stack (not illustrated) may flow through the inlet-side air passages 11a, 11b, and 13, and exhaust air released from the fuel cell stack may flow through the outlet-side air passages 12a, 12b, and 14.

The inlet-side air passages 11a, 11b, and 13 may include the inlet-side main air passages 11a and 11b that are opened or closed by the valve flap 30 and the inlet-side sub-air passage 13 that is opened or closed by the inlet-side check valve 50. The inlet-side main air passages 11a and 11b may include the first inlet-side air passage 11a through which air may be released toward the fuel cell stack and the second inlet-side air passage 11b through which air may be introduced from an air supply apparatus. The outlet-side air passages 12a, 12b, and 14 may include the outlet-side main air passages 12a and 12b that are opened or closed by the valve flap 30 and the outlet-side sub-air passage 14 that is opened or closed by the outlet-side check valve 60. Notably, the valves described herein may be operated by a controller having a process and a memory.

The outlet-side main air passages 12a and 12b may include the first outlet-side air passage 12a through which air released from the fuel cell stack may be introduced and the second outlet-side air passage 12b through which air may be released from the air shut-off valve apparatus. The valve flap 30 may be pivotally installed in the valve body 10 to open or close the inlet-side main air passages 11a and 11b and the outlet-side main air passages 12a and 12b. To guide the supply air into the fuel cell stack through the inlet-side sub-air passage 13 even while the valve flap 30 is closed, the inlet-side check valve 50 may be configured to be opened when the pressure of the supply air is greater than or equal to a predetermined pressure.

Further, to guide the exhaust air released from the fuel cell stack to flow through the outlet-side sub-air passage 14 even while the valve flap 30 is closed, the outlet-side check valve 60 may be configured to be opened when the pressure of the exhaust air is greater than or equal to a predetermined pressure. In general, a fuel cell system may include an air shut-off valve apparatus for regulating supply air supplied into a fuel cell stack and exhaust air released from the fuel cell stack.

Moreover, the air shut-off valve apparatus may include a valve flap that is opened or closed by electrical control (e.g., by the controller), and an air passage through which the supply air flows and/or an air passage through which the exhaust air flows may be opened or closed by operating the valve flap. When the valve flap is not operated normally due to a failure or malfunction in the air shut-off valve apparatus, air may not be supplied into the fuel cell stack, and therefore the fuel cell stack fails to generate electric power. As a result, driving power is unable to be supplied to a fuel cell vehicle. Furthermore, the pressure of the supply air supplied from an air compressor to the air shut-off valve apparatus may be increased excessively, and therefore a load is applied to the air shut-off valve apparatus or the air compressor. As a result, the air shut-off valve apparatus or the air compressor may be damaged.

Accordingly, air shut-off valve apparatus according to the exemplary embodiment has been developed to solve such problems in the related art. Particularly, the air shut-off valve apparatus according to the exemplary embodiment may include the inlet-side check valve 50 configured to be opened when the pressure of the supply air is greater than or equal to the predetermined pressure and the outlet-side check valve 60 configured to be opened when the pressure of the exhaust air is greater than or equal to the predetermined pressure, to guide the supply air into the fuel cell stack when the pressure of the supply air is greater than or equal to the predetermined pressure even while the valve flap 30 is closed and guide the exhaust air to be released from the fuel cell stack to the outside when the pressure of the exhaust air is greater than or equal to the predetermined pressure even while the valve flap 30 is closed. Features of the air shut-off valve apparatus according to this exemplary embodiment will be described below in more detail.

The air shut-off valve apparatus may further include a valve motor (not illustrated) and a valve shaft 40 to operate the valve flap 30. The valve flap 30 may include a plurality of valve flaps 30. In particular, the plurality of valve flaps 30 may each be configured to open or close the inlet-side main air passages 11a and 11b and the outlet-side main air passages 12a and 12b. The inlet-side sub-air passage 13 may connect to the second inlet-side main air passage 11b. The inlet-side sub-air passage 13 may be connected to the second inlet-side main air passage 11b at a first end thereof and to the fuel cell stack at a second end thereof. Although not illustrated, the inlet-side sub-air passage 13 may also connect to the first inlet-side main air passage 11a. In this case, the inlet-side sub-air passage 13 may be connected to the first inlet-side main air passage 11a at the first end thereof and to the fuel cell stack at the second end thereof.

The outlet-side sub-air passage 14 may connect to the second outlet-side main air passage 12b. The outlet-side sub-air passage 14 may be connected to the second outlet-side main air passage 12b at a first end thereof and to the fuel cell stack at a second end thereof. Although not illustrated, the outlet-side sub-air passage 14 may also connect to the first outlet-side main air passage 12a. In this case, the outlet-side sub-air passage 14 may be connected to the first outlet-side main air passage 12a at the first end thereof and to the fuel cell stack at the second end thereof.

The inlet-side check valve 50 may be installed at the position where the inlet-side sub-air passage 13 connects to the inlet-side main air passages 11a and 11b. In this exemplary embodiment, the inlet-side check valve 50 may be installed at the point where the inlet-side sub-air passage 13 and the second inlet-side main air passage 11b are connected together. The outlet-side check valve 60 may be installed at the position where the outlet-side sub-air passage 14 connects to the outlet-side main air passages 12a and 12b. In this exemplary embodiment, the outlet-side check valve 60 may be installed at the point where the outlet-side sub-air passage 14 and the second outlet-side main air passage 12b are connected together.

Referring to FIG. 3, the inlet-side check valve 50 may include a first packing 51 configured to move between an opening position where the first packing 51 opens the inlet-side sub-air passage 13 and a closing position where the first packing 51 closes the inlet-side sub-air passage 13. The inlet-side check valve 50 may include a first elastic member 52 that elastically supports the first packing 51 toward the closing position. The first elastic member 52 may be installed within the valve body 10. The first packing 51 may contain an elastic material to effectively close the inlet-side sub-air passage 13 when the first packing 51 is disposed in the closing position. For example, the first packing 51 may be formed of a substantially elastic material, or an elastic material may be applied to an outer surface of the first packing 51. For example, the elastic material may be rubber.

Referring to FIG. 3, the first packing 51 may be a packing in a ball shape, but the present disclosure is not limited thereto. The first packing 51 may be installed in the inlet-side sub-air passage 13 to be moved from the closing position to the opening position by the pressure of the supply air introduced through the second inlet-side main air passage 11b. The first elastic member 52 may be installed in the second inlet-side main air passage 11b to elastically support the first packing 51 toward the closing position. The first elastic member 52 may have a predetermined modulus of elasticity to allow the first packing 51 to move from the closing position to the opening position when a force exerted on the first packing 51 by the pressure of the supply air is greater than or equal to a predetermined value.

Additionally, the outlet-side check valve 60 may include a second packing 61 configured to move between an opening position where the second packing 61 opens the outlet-side sub-air passage 14 and a closing position where the second packing 61 closes the outlet-side sub-air passage 14. The outlet-side check valve 60 may include a second elastic member 62 that elastically supports the second packing 61 toward the closing position. The second elastic member 62 may be installed within the valve body 10. The second packing 61 may contain an elastic material to effectively close the outlet-side sub-air passage 14 when the second packing 61 is disposed in the closing position. For example, the second packing 61 may be formed of a substantially elastic material, or an elastic material may be applied to an outer surface of the second packing 61. For example, the elastic material may be rubber.

Referring to FIG. 3, the second packing 61 may be a packing in a ball shape, but the present disclosure is not limited thereto. The second packing 61 may be installed in the second outlet-side main air passage 12b to be moved from the closing position to the opening position by the pressure of the exhaust air introduced through the outlet-side sub-air passage 14. The second elastic member 62 may be installed in the second outlet-side main air passage 12b to elastically support the first packing 61 toward the closing position. The second elastic member 62 may have a predetermined modulus of elasticity to allow the second packing 61 to move from the closing position to the opening position when a force exerted on the second packing 61 by the pressure of the exhaust air is greater than or equal to a predetermined value.

An operation of the above-configured air shut-off valve apparatus according to the exemplary embodiment of the present disclosure will be described below. First, supply air may be introduced into the second inlet-side main air passage 11b of the air shut-off valve apparatus from the air supply apparatus (e.g., an air compressor). At this time, if the valve flap 30 is not operated normally so that the inlet-side main air passages 11a and 11b are closed, the pressure of the supply air in the second inlet-side main air passage 11b, into which the supply air is introduced from the air supply apparatus, may increase.

When the pressure of the supply air in the second inlet-side main air passage 11b is greater than or equal to a predetermined pressure, a force exerted on the first packing 51 by the pressure of the supply air overcomes the elastic force of the first elastic member 52, and the first packing 51 may be moved from the closing position to the opening position. When the first packing 51 is moved to the opening position, the inlet-side sub-air passage 13 may be opened, and the supply air may be supplied into the fuel cell stack through the inlet-side sub-air passage 13 as indicated by arrow F1 of FIG. 3.

Meanwhile, exhaust air released from the fuel cell stack may be introduced into the air shut-off valve apparatus through the first outlet-side main air passage 12a and the outlet-side sub-air passage 14. At this time, if the valve flap 30 is not operated normally so that the outlet-side main air passages 12a and 12b are closed, the pressure of the exhaust air in the outlet-side sub-air passage 14, into which the exhaust air is introduced from the fuel cell stack, may increase.

When the pressure of the exhaust air in the outlet-side sub-air passage 14 is greater than or equal to a predetermined pressure, a force exerted on the second packing 61 by the pressure of the exhaust air overcomes the elastic force of the second elastic member 62, and the second packing 61 may be moved from the closing position to the opening position. When the second packing 61 is moved to the opening position, the outlet-side sub-air passage 14 is opened, and the exhaust air may be released to the outside (or an exhaust system of a vehicle) through the outlet-side sub-air passage 14 as indicated by arrow F2 of FIG. 3.

Figure 4A:
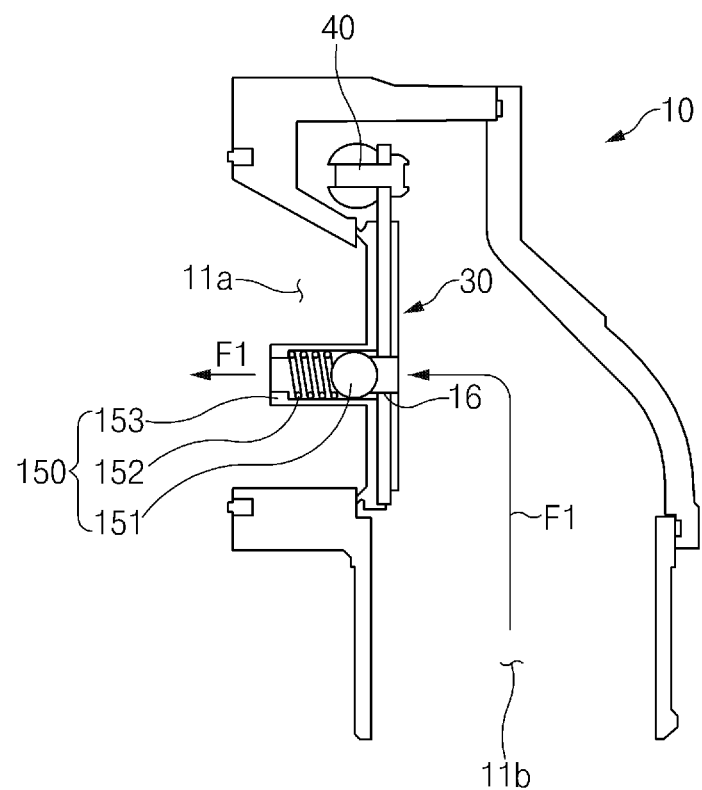
FIGS. 4A and 4B are sectional views illustrating an air shut-off valve apparatus for a fuel cell system according to another exemplary embodiment of the present disclosure.
Figure 4B:
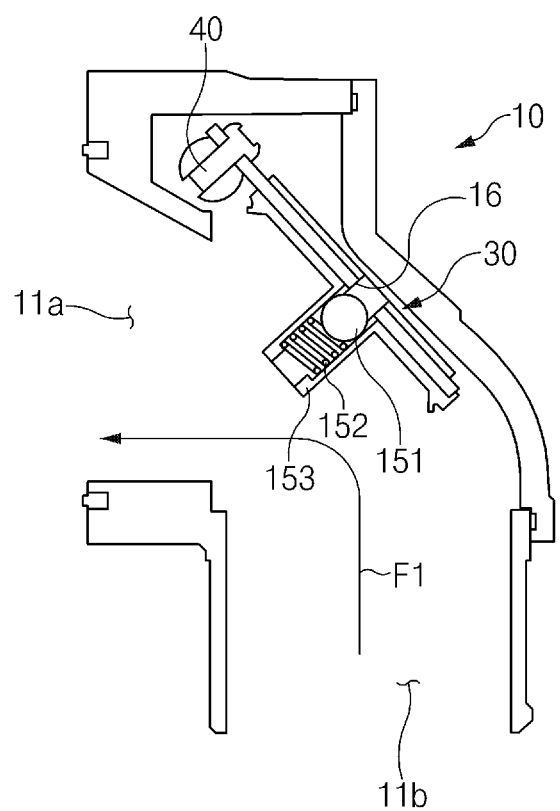

FIGS. 4A and 4B are sectional views illustrating an air shut-off valve apparatus for a fuel cell system according to another exemplary embodiment of the present disclosure. Referring to FIGS. 4A and 4B, in this exemplary embodiment, an inlet-side check valve 150 may be installed on the valve flap 30. The inlet-side check valve 150 may be installed on a first side of the valve flap 30 to prevent disruption of the pivoting of the valve flap 30 when the valve flap 30 pivots as illustrated in FIG. 4B.

The valve flap 30 may include a first valve flap aperture 16 formed therein, which is opened or closed by the inlet-side check valve 150. The inlet-side check valve 150 may include a first check valve housing 153, a first packing 151, and a first elastic member 152. The first check valve housing 153 may extend from the valve flap 30 to one side. The first check valve housing 153 may extend from one side surface of the valve flap 30 in a direction perpendicular thereto. The first check valve housing 153 may include an inner space in which the first packing 151 and the first elastic member 152 may be accommodated.

Furthermore, the first check valve housing 153 may provide a passage through which supply air passing through the first valve flap aperture 16 may flow. The first packing 151 may be installed in the first check valve housing 153 to move between an opening position where the first packing 151 opens the first valve flap aperture 16 and a closing position where the first packing 151 closes the first valve flap aperture 16. The first elastic member 152 may be installed in the first check valve housing 153 to elastically support the first packing 151 toward the closing position.

Although not illustrated, an outlet-side check valve (not illustrated) may have a configuration similar to that of the inlet-side check valve 150. However, the outlet-side check valve differs from the inlet-side check valve 150 in that a second packing of the outlet-side check valve may be moved from a closing position to an opening position (to the right with respect to FIG. 4A) by the pressure of exhaust air introduced through the first outlet-side main air passage 12a, whereas the first packing 151 of the inlet-side check valve 150 may be moved from the closing position to the opening position (to the left with respect to FIG. 4A) by the pressure of the supply air introduced through the second inlet-side main air passage 11b. Accordingly, a direction in which the second packing is supported by a second elastic member may be opposite to the direction in which the first packing 151 is supported by the first elastic member 152. In other words, the first packing 151 may be moved from right to left with respect to FIG. 4A when moved from the closing position to the opening position, and the second packing may be moved from left to right with respect to FIG. 4A when moved from the closing position to the opening position.

An operation of the above-configured air shut-off valve apparatus according to the other exemplary embodiment of the present disclosure will be described below. First, supply air may be introduced into the second inlet-side main air passage 11b of the air shut-off valve apparatus from the air supply apparatus (e.g., an air compressor). At this time, if the valve flap 30 is not operated normally so that the inlet-side main air passages 11a and 11b are closed, the pressure of the supply air in the second inlet-side main air passage 11b, into which the supply air is introduced from the air supply apparatus may increase.

When the pressure of the supply air in the second inlet-side main air passage 11b is greater than or equal to a predetermined pressure, a force exerted on the first packing 151 by the pressure of the supply air overcomes the elastic force of the first elastic member 152, and the first packing 151 may be moved from the closing position to the opening position. When the first packing 151 is moved to the opening position, the first valve flap aperture 16 may be opened, and the supply air may be introduced into the first inlet-side main air passage 11a through the air passage in the first check valve housing 153 as indicated by arrow F1 of FIG. 4A. As a result, the supply air may be supplied into the fuel cell stack.

Meanwhile, exhaust air released from the fuel cell stack may be introduced into the air shut-off valve apparatus through the first outlet-side main air passage 12a. At this time, if the valve flap 30 is not operated normally so that the outlet-side main air passages 12a and 12b are closed, the pressure of the exhaust air in the first outlet-side main air passage 12a, into which the exhaust air is introduced from the fuel cell stack may increase. When the pressure of the exhaust air in the first outlet-side main air passage 12a is greater than or equal to a predetermined value, a force exerted on the second packing by the pressure of the exhaust air overcomes the elastic force of the second elastic member, and the second packing may be moved from the closing position to the opening position. When the second packing is moved to the opening position, a second valve flap aperture (not illustrated) that is formed in the valve flap 30 may be opened, and the exhaust air may be introduced into the second outlet-side main air passage 12b through an air passage in a second check valve housing (not illustrated). As a result, the exhaust air may be released to the outside (or the exhaust system of the vehicle).

Referring to FIG. 4B, when the valve flap 30 is operated normally (e.g., due to error, failure, or malfunction) and opened, the supply air may flow from the second inlet-side main air passage 11b to the first inlet-side main air passage 11b as indicated by arrow F1 of FIG. 4B. Accordingly, the supply air may be supplied into the fuel cell stack. Furthermore, when the valve flap 30 is opened, the exhaust air released from the fuel cell stack may flow from the first outlet-side main air passage (not illustrated) to the second outlet-side main air passage (not illustrated) and may be released to the exhaust system.

According to the exemplary embodiments of the present disclosure, at least the following effects are achieved.

The air shut-off valve apparatus may include the inlet-side check valve configured to be opened when the pressure of the supply air is greater than or equal to the predetermined pressure and the outlet-side check valve configured to be opened when the pressure of the exhaust air is greater than or equal to the predetermined pressure. Accordingly, the air shut-off valve apparatus may supply minimum required supply air into the fuel cell stack and may release minimum required exhaust air from the fuel cell stack even while the valve flap is not opened.

Effects of the present disclosure are not limited to the aforementioned effects, and any other effects not mentioned herein will be clearly understood from the accompanying claims by those skilled in the art to which the present disclosure pertains. Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An air shut-off valve apparatus for a fuel cell system, comprising:
   a valve body having an inlet-side air passage through which supply air supplied into a fuel cell stack flows and an outlet-side air passage through which exhaust air released from the fuel cell stack flows;
   a valve flap pivotally installed within the valve body to open or close the inlet-side air passage and the outlet-side air passage;
   an inlet-side check valve configured to be opened when pressure of the supply air is greater than or equal to a predetermined pressure, to guide the supply air into the fuel cell stack through the inlet-side air passage even while the valve flap is closed; and
   an outlet-side check valve configured to be opened when pressure of the exhaust air is greater than or equal to a predetermined pressure, to guide the exhaust air released from the fuel cell stack to flow through the outlet-side air passage even while the valve flap is closed.

2. The air shut-off valve apparatus of claim 1, wherein the inlet-side air passage includes
   an inlet-side main air passage that is opened or closed by the valve flap; and
   an inlet-side sub-air passage that is opened or closed by the inlet-side check valve.

3. The air shut-off valve apparatus of claim 2, wherein the outlet-side air passage includes:
   an outlet-side main air passage that is opened or closed by the valve flap; and
   an outlet-side sub-air passage that is opened or closed by the outlet-side check valve.

4. The air shut-off valve apparatus of claim 3, wherein the inlet-side check valve is installed at a position where the inlet-side sub-air passage connects to the inlet-side main air passage, and the outlet-side check valve is installed at a position where the outlet-side sub-air passage connects to the outlet-side main air passage.

5. The air shut-off valve apparatus of claim 4, wherein the inlet-side check valve includes:
   a first packing configured to move between an opening position where the first packing opens the inlet-side sub-air passage and a closing position where the first packing closes the inlet-side sub-air passage; and
   a first elastic member configured to elastically support the first packing toward the closing position.

6. The air shut-off valve apparatus of claim 5, wherein the outlet-side check valve includes:
   a second packing configured to move between an opening position where the second packing opens the outlet-side sub-air passage and a closing position where the second packing closes the outlet-side sub-air passage; and
   a second elastic member configured to elastically support the second packing toward the closing position.

7. The air shut-off valve apparatus of claim 6, wherein the first packing is installed in the inlet-side sub-air passage to be moved from the closing position to the opening position by the pressure of the supply air introduced through the inlet-side main air passage, and the second packing is installed in the outlet-side main air passage to be moved from the closing position to the opening position by the pressure of the exhaust air introduced through the outlet-side sub-air passage.

8. The air shut-off valve apparatus of claim 6, wherein the first elastic member has a predetermined modulus of elasticity to allow the first packing to move from the closing position to the opening position when a force exerted on the first packing by the pressure of the supply air is greater than or equal to a predetermined value, and the second elastic member has a predetermined modulus of elasticity to allow the second packing to move from the closing position to the opening position when a force exerted on the second packing by the pressure of the exhaust air is greater than or equal to a predetermined value.

9. The air shut-off valve apparatus of claim 6, wherein the first elastic member and the second elastic member are installed within the valve body to elastically support the first packing and the second packing, respectively.

10. The air shut-off valve apparatus of claim 1, wherein the inlet-side check valve and the outlet-side check valve are installed on the valve flap.

11. The air shut-off valve apparatus of claim 10, wherein the valve flap includes a first valve flap aperture that is opened or closed by the inlet-side check valve and a second valve flap aperture that is opened or closed by the outlet-side check valve.

12. The air shut-off valve apparatus of claim 10, wherein the inlet-side check valve and the outlet-side check valve are installed on one side of the valve flap to prevent disruption of pivoting of the valve flap.

* * * * *